(12) United States Patent
Sanz et al.

(10) Patent No.: US 10,875,954 B2
(45) Date of Patent: Dec. 29, 2020

(54) SUPERELASTIC POLYURETHANE MASTICS

(71) Applicant: BOSTIK SA, La Plaine Saint Denis (FR)

(72) Inventors: Federico Sanz, Choisy Au Bac (FR); Andre Opillard, Noyon (FR)

(73) Assignee: BOSTIK SA, Colombes (FR)

( * ) Notice: Subject to any disclaimer, the term of this patent is extended or adjusted under 35 U.S.C. 154(b) by 130 days.

(21) Appl. No.: 16/064,052

(22) PCT Filed: Dec. 20, 2016

(86) PCT No.: PCT/FR2016/053575
§ 371 (c)(1),
(2) Date: Jun. 20, 2018

(87) PCT Pub. No.: WO2017/109383
PCT Pub. Date: Jun. 29, 2017

(65) Prior Publication Data
US 2019/0002621 A1   Jan. 3, 2019

(30) Foreign Application Priority Data

Dec. 21, 2015 (FR) .................................. 15 63001

(51) Int. Cl.
| | | |
|---|---|---|
| C08G 18/12 | (2006.01) | |
| C08G 18/76 | (2006.01) | |
| C08G 18/30 | (2006.01) | |
| C08G 18/48 | (2006.01) | |
| C08L 75/08 | (2006.01) | |
| C08G 18/10 | (2006.01) | |
| C08G 18/75 | (2006.01) | |
| C08L 75/04 | (2006.01) | |

(52) U.S. Cl.
CPC ............. *C08G 18/12* (2013.01); *C08G 18/10* (2013.01); *C08G 18/307* (2013.01); *C08G 18/4812* (2013.01); *C08G 18/755* (2013.01); *C08G 18/7621* (2013.01); *C08G 18/7642* (2013.01); *C08G 18/7671* (2013.01); *C08L 75/04* (2013.01); *C08L 75/08* (2013.01)

(58) Field of Classification Search
CPC ...... C08G 18/10; C08G 18/12; C08G 18/307; C08G 18/4812; C08G 18/755; C08G 18/7621; C08G 18/7642; C08G 18/7671; C08L 75/04; C08L 75/08
See application file for complete search history.

(56) References Cited

U.S. PATENT DOCUMENTS

| | | | | |
|---|---|---|---|---|
| 3,479,325 A | * | 11/1969 | Oertel Gunter .... | C08G 18/0885 528/69 |
| 4,623,709 A | | 11/1986 | Bauriedel | |
| 6,221,978 B1 | * | 4/2001 | Li ..................... | C08G 18/12 156/325 |
| 6,515,164 B1 | * | 2/2003 | Bolte ................. | B32B 7/12 560/25 |
| 2007/0129525 A1 | | 6/2007 | Eichelmann et al. | |
| 2011/0154772 A1 | * | 6/2011 | Lontchar ............ | C08G 18/4825 52/745.05 |
| 2015/0344614 A1 | | 12/2015 | Sanz | |

FOREIGN PATENT DOCUMENTS

| | | |
|---|---|---|
| DE | 19731680 A1 | 1/1999 |
| EP | 0150444 A2 | 8/1985 |
| EP | 2949676 A1 | 12/2015 |
| WO | 2005/097861 A1 | 10/2005 |

OTHER PUBLICATIONS

International Search Report dated Apr. 13, 2017 issued in corresponding PCT/FR2016/053575 application (3 pages).
English Abstract of DE 19731680 A1 published Jan. 28, 1999.

* cited by examiner

*Primary Examiner* — Christopher M Rodd
(74) *Attorney, Agent, or Firm* — Millen, White, Zelano and Branigan, P.C.

(57) ABSTRACT

The invention relates to a method for synthesizing NCO-terminated polyurethanes having improved elastic properties, said method involving the staggered addition of diisocyanate(s). The invention also relates to NCO-terminated polyurethanes that have high elongation at break and can be obtained using the disclosed method. The invention finally relates to adhesive, mastic and/or coating compositions comprising the disclosed NCO-terminated polyurethane.

18 Claims, No Drawings

SUPERELASTIC POLYURETHANE MASTICS

FIELD OF THE INVENTION

The present invention relates to a process for producing NCO-terminated polyurethanes based on MDI, having improved elastic properties, in particular a higher elongation at break and also an improvement in elastic recovery. The present invention also relates to NCO-terminated polyurethanes having a high elongation at break, capable of being obtained by the process according to the invention. The invention finally relates to adhesive, mastic and/or surface coating compositions comprising the NCO-terminated polyurethane according to the invention.

TECHNOLOGICAL BACKGROUND

In order to meet the widest possible variety of needs, it is sought to develop mastic compositions that may be used or applied at low temperature (between 5 and 35° C.) and especially at ambient temperature (23° C.).

Numerous commercially available mastic compositions are produced from reactive polyurethanes based on MDI (diphenylmethylene diisocyanate), especially having isocyanate (NCO) end groups which crosslink in the presence of moisture.

NCO-terminated polyurethanes based on MDI are conventionally prepared by reaction of a polyol with a stoichiometric excess of MDI. This stoichiometric excess may be expressed by an NCO/OH molar ratio (denoted "NCO/OH ratio") of strictly greater than 1, which corresponds to the molar ratio of the number of isocyanate (NCO) groups to the number of hydroxyl (OH) groups borne by the reactive species bearing such functions, used in the preparation of the polyurethane. Said stoichiometric excess is necessary to obtain isocyanate end groups on the polyurethane. This type of process makes it possible to obtain NCO-terminated polyurethanes having an elongation at break of less than 1000%, which may prove insufficient for some applications.

Thus, there is a need to provide an NCO-terminated polyurethane prepolymer having a better elongation at break, in particular an elongation at break of greater than or equal to 1000%, while maintaining the other characteristics thereof, such as viscosity, modulus of rupture or 100% modulus, at acceptable levels.

SUMMARY OF THE INVENTION

A first subject of the present invention relates to a process for preparing NCO-terminated polyurethanes, said polyurethane being non-solid at a temperature ranging from 5 to 35° C., said process comprising, successively:
  a) the reaction of a composition of diisocyanate(s) with a composition of polyol(s) with an NCO/OH molar ratio strictly less than 1, in order to obtain an OH-terminated precursor polyurethane, at least one of said diisocyanates being present at an amount of at least 80% by weight relative to the total weight of the composition of diisocyanate(s), and
  b) the reaction of said OH-terminated precursor polyurethane obtained in this way with a diphenylmethylene diisocyanate composition in order to obtain NCO-terminated polyurethanes, said diphenylmethylene diisocyanate composition comprising at least 80% by weight of the same diphenylmethylene diisocyanate compound, steps a) and b) being carried out under anhydrous conditions.

According to one embodiment of the invention, the composition of diisocyanate(s) used in step a) comprises at least 85% by weight, preferably at least 90% by weight, more preferably still at least 95% by weight, even more preferentially at least 98% by weight of the same diisocyanate, relative to the total weight of the composition of diisocyanate(s) used in step a).

According to one embodiment of the invention, the composition of diisocyanate(s) used during step a) comprises at least one diisocyanate selected from diphenylmethylene diisocyanate (MDI), isophorone diisocyanate (IPDI), toluene diisocyanate (TDI), xylylene diisocyanate (XDI), dibenzyl diisocyanate (DBDI), hexamethylene diisocyanate (HDI) or an allophanate derived from hexamethylene diisocyanate.

According to one embodiment of the invention, the composition of diphenylmethylene diisocyanate used in step b) comprises at least 85% by weight, more preferably still at least 90% by weight, advantageously at least 95% by weight, even more advantageously at least 98% by weight of the same diphenylmethylene diisocyanate compound, relative to the total weight of the composition of diphenylmethylene diisocyanate.

According to one embodiment of the invention, the diphenylmethylene diisocyanate composition used in step b) comprises at least 80% by weight, preferably at least 85% by weight, more preferably still at least 90% by weight, advantageously at least 95% by weight, even more advantageously at least 98% by weight of 4,4'-diphenylmethylene diisocyanate, relative to the total weight of the composition of diphenylmethylene diisocyanate.

According to one embodiment of the invention, the polyol composition consists of a mixture of polyether diol and of polyether triol.

According to one embodiment of the invention, the NCO/OH molar ratio during step a) is less than or equal to 0.9, and/or the NCO/OH molar ratio during step b) is strictly greater than 1, preferably greater than or equal to 1.2, more preferably still greater than or equal to 1.5, advantageously greater than or equal to 1.7.

According to one embodiment of the invention, the NCO-terminated polyurethanes have an elongation at break of greater than or equal to 1000%.

The present invention also relates to an NCO-terminated polyurethane based on diphenylmethylene diisocyanate, capable of being obtained according to the process as defined in the present invention, said polyurethane being non-solid at a temperature ranging from 5 to 35° C. and having an elongation at break of greater than or equal to 1000%.

The present invention also relates to a composition comprising:
  at least one polyurethane according to the invention or at least one polyurethane capable of being obtained according to the process according to the invention,
  at least one filler, and
  at least one crosslinking catalyst.

According to one embodiment of the invention, the composition comprises:
  from 10 to 40% by weight, preferably from 15 to 30% by weight, of polyurethane,
  from 20 to 70% by weight, preferably from 25 to 60% by weight, of at least one filler,
  from 0.01 to 1% by weight of at least one crosslinking catalyst, the percentages by weight being expressed relative to the total weight of the composition.

The invention finally relates to an article comprising the composition according to the invention in an airtight hermetic packaging.

Surprisingly, the inventors have discovered that the sequential (2-step) introduction of the diisocyanates enabled the production of NCO-terminated polyurethane having better elastic properties, in particular a higher elongation at break, hitherto unreached by the existing processes.

Thus, the present invention makes it possible to provide NCO-terminated polyurethanes having better elastic properties.

The present invention makes it possible to provide adhesive, mastic and/or surface coating compositions having better elastic properties. Better elastic properties enable the adhesive, mastic and/or surface coating composition to be more resistant, especially to temperature variations.

For equivalent desired elastic properties, the invention also makes it possible to use smaller contents of polyurethane compared to existing mastics.

The composition according to the invention, in particular the mastic composition according to the invention, may therefore be used for various applications requiring excellent performance, such as construction or transport, especially air transport, in which the composition, such as the mastic composition, must be able to withstand and resist large temperature variations.

DETAILED DESCRIPTION OF EMBODIMENTS OF THE INVENTION

In the present application, unless indicated otherwise:
viscosity is measured at ambient temperature (23° C.). The measurement of viscosity at 23° C. may be carried out using a Brookfield viscometer according to standard ISO 2555. Typically, the measurement at 23° C. may be carried out using a Brookfield RVT viscometer with a spindle suitable for the viscosity range and at a rotational speed of 20 revolutions per minute (rpm);
the various embodiments described in the present application may be combined with one another.

The present invention firstly relates to a process for producing NCO-terminated polyurethanes, said process comprising, successively:
a) the reaction of a composition of diisocyanate(s) with a composition of polyol(s) with an NCO/OH molar ratio strictly less than 1, in order to obtain an OH-terminated precursor polyurethane, said composition of diisocyanate(s) comprising at least 80% by weight of the same compound, and
b) the reaction of said OH-terminated precursor polyurethane with a diphenylmethylene diisocyanate composition in order to obtain the NCO-terminated polyurethanes, said diphenylmethylene diisocyanate composition comprising at least 80% by weight of the same diphenylmethylene diisocyanate compound,
steps a) and b) being carried out under anhydrous conditions.

The NCO-terminated polyurethane obtained according to the invention is not a hot-melt polyurethane, that is to say it is not solid at a temperature ranging from 5 to 35° C., and especially at ambient temperature (23° C.). In particular, it has a viscosity measured at 23° C. of less than or equal to 300 000 mPa·s, preferably less than or equal to 250 000 mPa·s, more preferentially ranging from 100 to 200 000 mPa·s, and better still ranging from 4000 to 150 000 mPa·s (millipascal·second). Such polyurethanes are sufficiently fluid at a temperature ranging 5° C. to 35° C. to be able to be processed easily in this temperature range using application and/or mixing devices customarily used in the field of mastics, as illustrated especially in the examples of the present application.

The composition of diisocyanate(s) used during step a) comprises at least 80% by weight, preferably at least 85% by weight, more preferably still at least 90% by weight, advantageously at least 95% by weight, or even at least 98% by weight of the same diisocyanate species, relative to the total weight of the composition of diisocyanate(s). In other words, the composition of diisocyanate(s) used during step a) predominantly comprises the same diisocyanate ("predominant diisocyanate") which may be used alone or in a mixture with one or more other diisocyanates distinct therefrom. For the purposes of the present invention, the isomers of a given diisocyanate are considered as distinct species.

According to one embodiment of the invention, the composition of diisocyanate(s) used during step a) comprises at least 80% by weight of a diisocyanate selected from diphenylmethylene diisocyanate (MDI), isophorone diisocyanate (IPDI), toluene diisocyanate (TDI), xylylene diisocyanate (XDI), dibenzyl diisocyanate (DBDI), hexamethylene diisocyanate (HDI) or an allophanate derived from hexamethylene diisocyanate.

Preferably, the composition of diisocyanate(s) used during step a) comprises at least 80% by weight of a diisocyanate selected from 4,4'-diphenylmethylene diisocyanate (4,4'-MDI), IPDI, toluene diisocyanate (2,4-TDI), meta-xylylene diisocyanate (m-XDI), the allophanate derived from hexamethylene diisocyanate of formula (I) below:

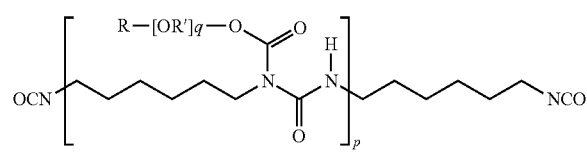

wherein:
p is an integer ranging from 1 to 2;
q is an integer ranging from 0 to 9, and preferably from 2 to 5;
R represents a saturated or unsaturated, cyclic or acyclic, linear or branched hydrocarbon-based chain comprising from 1 to 20 carbon atoms, preferably from 6 to 14 carbon atoms;
R' represents a divalent alkylene group having from 2 to 4 carbon atoms; and preferably a divalent propylene group.

Among the compounds of formula (I), mention may be made of Tolonate® X FLO 100 available from Vencorex.

According to one embodiment of the invention, the composition of diisocyanate(s) used during step a) is such that all the NCO functions react with the OH functions of the polyols of the polyol composition used during step a). Preferably, the diisocyanates of the composition of diisocyanate(s) used during step a) have NCO functions having similar reactivities, or even identical reactivities. By way of illustration, a "symmetrical" diisocyanate (or diisocyanate having a plane of symmetry or a point of symmetry) has NCO functions having identical reactivities.

According to one embodiment of the invention, the composition of diisocyanate(s) used during step a) comprises at least one diisocyanate selected from diphenylmethylene diisocyanate (MDI), isophorone diisocyanate (IPDI), xylylene diisocyanate (XDI), dibenzyl diisocyanate (DBDI), hexamethylene diisocyanate (HDI) or an allophanate derived from hexamethylene diisocyanate.

Preferably, the composition of diisocyanate(s) used during step a) comprises at least 80% by weight of a diisocyanate selected from 4,4'-diphenylmethylene diisocyanate (4,4'-MDI), IPDI, meta-xylylene diisocyanate (m-XDI), the allophanate derived from hexamethylene diisocyanate of formula (I) above.

The composition of polyol(s) used during step a) of the process according to the invention may consist of one polyol or of a mixture of polyols. In particular, the polyol(s) that may be used may be selected from those having a number-average molar mass ranging from 1000 to 18 000 g/mol and more particularly those having a number-average molar mass ranging from 1000 to 8000 g/mol.

The composition of polyol(s) may consist of one or more polyethers and/or of one or more polyesters that are amorphous, preferably of one or more amorphous polyethers.

According to one embodiment of the invention, the composition of polyol(s) comprises at least one triol and more preferentially at least one polyether triol.

Better still, the composition of polyol(s) is a mixture of polyether diol and triol, such as polypropylene glycol triol and polypropylene glycol diol.

During step a) of the process according to the invention, the NCO/OH molar ratio is strictly less than 1 in order to obtain an OH-terminated polyurethane precursor. Preferably, the NCO/OH molar ratio during step a) is less than or equal to 0.9, more preferably still less than or equal to 0.8, or even less than or equal to 0.7 or else less than or equal to 0.6.

In particular, the OH-terminated polyurethane obtained at the end of step a) no longer comprises terminal NCO functions.

Step b) consists in reacting the OH-terminated precursor polyurethane obtained at the end of step a) with a diphenylmethylene diisocyanate (MDI) composition, preferably with a 4,4'-diphenylmethylene diisocyanate (4,4'-MDI) composition. During step b) of the process according to the invention, the NCO/OH molar ratio is strictly greater than 1 in order to obtain an NCO-terminated polyurethane. Preferably, the NCO/OH molar ratio during step b) is greater than or equal to 1.2, more preferably still greater than or equal to 1.5, advantageously greater than or equal to 1.7. In particular, the NCO-terminated polyurethane obtained at the end of step b) no longer comprises terminal OH functions.

Thus, the NCO-terminated polyurethane obtained at the end of the process according to the invention has terminal chain-end NCOs originating from the reaction between the OH functions of the precursor polyurethane and the NCO functions of the diphenylmethylene diisocyanate.

The MDI composition used during step b) comprises at least 80% by weight, preferably at least 85% by weight, more preferably still at least 90% by weight, advantageously at least 95% by weight, even more advantageously at least 98% by weight of the same MDI compound, relative to the total weight of the MDI composition. Indeed, the MDI may be present as different isomers, among which mention may be made of 4,4'-MDI, 2,4'-MDI or else 2,2'-MDI.

Preferably, the MDI composition used during step b) comprises at least 80% by weight, preferably at least 85% by weight, more preferably still at least 90% by weight, advantageously at least 95% by weight, even more advantageously at least 98% by weight of 4,4'-MDI relative to the total weight of the MDI composition.

Steps a) and b) of the process according to the invention are carried out under anhydrous conditions, for example under a nitrogen atmosphere.

Preferably, the temperature during steps a) and b) of the process according to the invention is less than or equal to 95° C., more preferably still ranges from 75 to 80° C.

Preferably, steps a) and b) of the process according to the invention are carried out at atmospheric pressure.

The reaction catalyst(s) that may be used may be any catalyst known to those skilled in the art for catalyzing the formation of polyurethane by reaction of at least one polyisocyanate and of at least one polyol. The reaction catalyst is preferably added to the reaction medium during step a), it being understood that it will be present in the reaction medium during step b) if it is not eliminated from the medium.

The present invention secondly relates to an NCO-terminated polyurethane based on diphenylmethylene diisocyanate (MDI), capable of being obtained by the process according to the invention, said polyurethane being non-solid at a temperature ranging from 5 to 35° C. and having an elongation at break of greater than or equal to 1000%.

In the present invention, the elongation at break is measured according to standard NF ISO 37 (March 2012), using "dumbbell" type test specimens.

Preferably, the elongation at break of the NCO-terminated polyurethane according to the invention is greater than or equal to 1100%, preferably greater than or equal to 1200%. The elongation at break of the NCO-terminated polyurethane according to the invention may for example range from 1200 to 1800%.

The NCO-terminated polyurethane based on MDI according to the invention has for example the following groups at the chain ends:

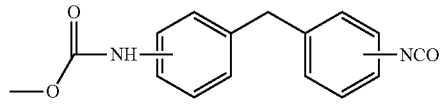

wherein the substituents of the aromatic rings may be located at different positions depending on the nature of the MDI used during the second step of the process (step b).

For example, the NCO-terminated polyurethane based on MDI obtained from an MDI composition consisting of 4,4'-MDI has the following groups at the chain ends:

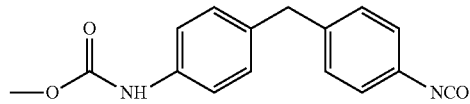

The polyurethane according to the invention may be in the form of a composition of polyurethane(s) which may optionally contain a mixture of several polyurethanes.

The invention also relates to an NCO-terminated polyurethane based on diphenylmethylene diisocyanate, obtained by the process as defined in the present invention, said polyurethane being non-solid at a temperature ranging from 5 to 35° C.

The polyurethane according to the invention, or the composition of polyurethanes according to the invention as described above, may be used to manufacture an adhesive, mastic and/or surface coating composition, especially for the field of construction.

The present invention also relates to a composition which may be used as adhesive, mastic and/or surface coating composition, comprising:
- at least one NCO-terminated polyurethane based on MDI according to the invention,
- at least one filler,
- at least one crosslinking catalyst.

According to one embodiment of the invention, the adhesive, mastic and/or surface coating composition has an elongation at break of greater than or equal to 1000%, preferably greater than or equal to 1100%, more preferably still greater than or equal to 1200%. The elongation at break of the adhesive, mastic and/or surface coating composition according to the invention may for example range from 1200% to 1800%.

According to one embodiment of the invention, the adhesive, mastic and/or surface coating composition comprises:
- from 10 to 40% by weight, preferably from 15 to 30% by weight, more preferably still from 20 to 30% by weight of at least one polyurethane according to the invention as described in any one of the preceding paragraphs,
- from 20% to 70% by weight, preferably from 25 to 60% by weight, more preferably still from 25 to 40% by weight, of at least one filler,
- from 0.01 to 1% by weight, preferably from 0.05 to 0.5% by weight, of at least one crosslinking catalyst, the percentages by weight being expressed relative to the total weight of the adhesive, mastic and/or surface coating composition.

According to a particular embodiment, the adhesive, mastic and/or surface coating composition according to the invention may comprise:
- from 10 to 40% by weight, preferably from 15 to 30% by weight, more preferably still from 20 to 30% by weight of at least one NCO-terminated polyurethane according to the invention,
- from 20 to 70% by weight, preferably from 25 to 60% by weight, more preferably still from 25 to 40% by weight, of at least one filler,
- from 0.01 to 1% by weight, preferably from 0.05 to 0.5% by weight, of at least one crosslinking catalyst,
- from 1 to 40% by weight, preferably from 5 to 30% by weight, more preferably still from 10 to 25% by weight, of at least one rheological agent, the percentages by weight being expressed relative to the total weight of the adhesive, mastic and/or surface coating composition.

As crosslinking catalyst(s) that may be used in the adhesive, mastic and/or surface coating composition according to the invention, use may be made of any catalyst(s) known to those skilled in the art for catalyzing the crosslinking of the NCO-terminated polyurethane in the presence of water (or moisture). The water or the moisture may be supplied by the surface of the support or the surrounding environment, in a natural (atmospheric humidity) or controlled (for example in a temperature-controlled chamber at a relative humidity of between 40 and 70% at 23° C., or an oven ranging up to 150° C.) manner in contact with the composition according to the invention. This crosslinking is reflected by the creation, between the polymeric chains of the polyurethane, of urea-type bonds which lead to the formation of a three-dimensional polymeric network.

Use may be made for example of one or more crosslinking catalysts selected from dioctyltin dilaurate (DOTL), bismuth-based catalysts or else tertiary amine catalysts such as:

1,8-diazabicyclo[5.4.0]undec-7-ene (DBU):

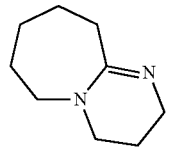 [SMILES: C1CCC2=NCCCN2CC1]

1,5-diazabicyclo[4.3.0]non-5-ene (DBN):

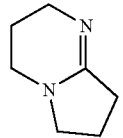

2,2'-dimorpholinodiethyl ether (DMDEE):

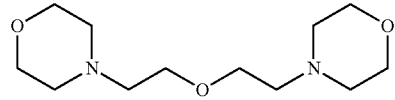 [SMILES: C1CN(CCOCCN2CCOCC2)CCO1]

1,4-diazabicyclo[2.2.2]octane (DABCO):

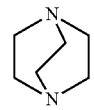

These crosslinking catalysts have the advantage of not being carcinogenic, mutagenic or reprotoxic (CMR).

Preferably, the amount of crosslinking catalyst which may be used ranges from 0.01 to 1% by weight, more preferably still from 0.05 to 0.5% by weight relative to the weight of the adhesive, mastic and/or surface coating composition according to the invention.

The filler(s) which may be used in the adhesive, mastic and/or surface coating composition according to the invention may be selected from mineral fillers and mixtures of organic fillers and mineral fillers.

As example of mineral filler(s) which may be used, use may be made of any mineral filler(s) customarily used in the field of adhesive, mastic and/or surface coating compositions. These fillers are in the form of particles with varied geometry. They may for example be spherical, fibrous, or have an irregular shape.

Preferably, use is made of clay, quartz or carbonate fillers.

More preferentially, use is made of carbonate fillers, such as alkali metal or alkaline-earth metal carbonates, and more preferentially calcium carbonate.

These fillers may be natural or treated, for example by means of an organic acid such as stearic acid or a mixture of organic acids consisting predominantly of stearic acid.

Use may also be made of hollow mineral microspheres such as hollow glass microspheres, and more particularly those made of calcium sodium borosilicate or of aluminosilicate.

The amount of mineral filler that may be used may especially range from 20% to 70% by weight, preferably from 25% to 60% by weight and more preferentially from 25% to 40% by weight of the weight of the adhesive, mastic and/or surface coating composition according to the invention.

As examples of organic filler(s) which may be used, use may be made of any organic filler(s) and especially polymeric filler(s) customarily used in the field of adhesive, mastic and/or surface coating compositions.

Use may be made, for example, of polyvinyl chloride (PVC), polyolefins, rubber, ethylene vinyl acetate (EVA), or aramid fibres such as Kevlar®.

Use may also be made of hollow microspheres made of expandable or non-expandable thermoplastic polymer. Mention may be made especially of hollow microspheres of vinylidene chloride/acrylonitrile.

Use is preferably made of PVC.

The mean particle size of the filler(s) that may be used is preferably less than or equal to 10 microns, more preferentially less than or equal to 3 microns, so as to avoid their sedimentation in the adhesive, mastic and/or surface coating composition according to the invention during storage thereof.

The mean particle size is measured for a volume particle size distribution corresponding to 50% by volume of the sample of particles analyzed. When the particles are spherical, the mean particle size corresponds to the median diameter (D50 or Dv50) which corresponds to the diameter such that 50% of the particles by volume have a size smaller than said diameter. In the present application, this value is expressed in micrometers and determined according to standard NF ISO 13320-1 (1999) by laser scattering on a Malvern machine.

The mastic composition according to the invention may comprise at least one plasticizer in an amount of from 5 to 20% by weight, preferably from 10 to 15% by weight of the weight of the adhesive, mastic and/or surface coating composition according to the invention.

As examples of plasticizers that may be used, use may be made of any plasticizer customarily used in the field of adhesive, mastic and/or surface coating compositions.

Use is preferably made of:
diisodecyl phthalate (DIDP)
an ester of an alkylsulfonic acid and of phenol, as sold under the name Mesamoll® by Lanxess
diisononyl 1,2-cyclohexanedicarboxylate, as sold under the name Hexamoll Dinch® by BASF.

The adhesive, mastic and/or surface coating composition according to the invention may comprise at least one rheology agent.

As examples of rheology agent(s) that may be used, mention may be made of any rheology agent customarily used in the field of adhesive, mastic and/or surface coating compositions.

Use is preferably made of one or more rheology agents selected from thixotropic agents, and more preferentially from:
PVC plastisols, corresponding to a suspension of PVC in a plasticizer that is miscible with PVC, obtained in situ by heating to temperatures ranging from 60° C. to 80° C. These plastisols may be those described especially in the publication Polyurethane Sealants, Robert M. Evans, ISBN 087762-998-6,
fumed silica,
urea derivatives derived from the reaction of an aromatic diisocyanate monomer such as 4,4'-MDI with an aliphatic amine such as butylamine. The preparation of such urea derivatives is described especially in patent application FR 1 591 172.

The total content of rheology agent(s) that may be used may range from 1 to 40% by weight, preferably from 5 to 30% by weight and more preferentially from 10 to 25% by weight of the weight of the adhesive, mastic and/or surface coating composition according to the invention.

The composition according to the invention may comprise at least one adjuvant selected from adhesion promoters such as epoxysilanes, UV stabilizers (or antioxidants), pigments, colorants, and the mixture thereof. When these adjuvants are present in the composition, the total sum of their content is preferably less than or equal to 15% by weight relative to the total weight of the adhesive, mastic and/or surface coating composition according to the invention.

The composition according to the invention preferably comprises:
from 10 to 40% by weight, preferably from 15 to 30% by weight of at least one NCO-terminated polyurethane according to the invention as described in any one of the preceding paragraphs,
from 10 to 35% by weight, preferably from 15 to 30% by weight, of at least one carbonate filler,
from 10 to 35% by weight, preferably from 15 to 30% by weight, of at least one organic filler and/or at least one rheology agent,
from 0.01 to 1% by weight of at least one crosslinking catalyst,
the percentages by weight being expressed relative to the weight of the adhesive, mastic and/or surface coating composition.

The composition according to the invention is preferably a mastic composition.

The adhesive, mastic and/or surface coating compositions according to the invention are formulated so as to be able to be used or applied at low temperature (between 5 and 35° C.) and especially at ambient temperature (23° C.).

A subject of the present invention is a process for preparing an adhesive, mastic and/or surface coating composition according to the invention, said preparation process comprising a step in which the ingredient(s) optionally present in the adhesive, mastic and/or surface coating composition according to the invention is (are) mixed with a non-hot-melt NCO-terminated polyurethane composition at a temperature of less than or equal to 50° C., preferably ranging from 5 to 45° C., and better still ranging from 20 to 30° C.

The addition and the mixing are preferably carried out under anhydrous conditions.

The adhesive, mastic and/or surface coating composition according to the invention is preferably stored in an anhydrous environment, for example in hermetic packaging in which the adhesive, mastic and/or surface coating composition is protected from moisture and preferably protected from light.

Another subject of the present invention is an article comprising the adhesive, mastic and/or surface coating composition according to the invention in an airtight hermetic packaging. The hermetic packaging is preferably an aluminum bag or an aluminum cartridge.

The adhesive, mastic and/or surface coating composition may be used in a process comprising:
applying said composition to a surface, followed by
moistening said applied composition.

Alternatively, the adhesive, mastic and/or surface coating composition may be used in a process comprising:

moistening the surface, followed by
applying said composition to said moistened surface.

The surface may be a concrete surface or a metal surface, such as an aluminum surface.

The following examples are given purely by way of illustration of the invention and should not be interpreted as limiting the scope thereof.

EXAMPLES

Comparative Polyurethanes A and B: One-Step Process

The comparative polyurethanes A and B were prepared by mixing the ingredients indicated in table 1 at a temperature of less than or equal to 95° C. under anhydrous conditions. The amounts indicated in table 1 are expressed as percentage by weight relative to the total weight of the polyurethane composition of each of the examples.

TABLE 1

| comparative polyurethanes | | |
|---|---|---|
| | A | B |
| PPG triol having a number-average molar mass of 4000 g/mol | 13.700 | 13.700 |
| PPG diol having a number-average molar mass of 2000 g/mol | 68.500 | 68.500 |
| 4,4'-MDI (% NCO = 33.6% by weight) | 17.767 | 17.767 |
| Catalyst (DOTL) | | 0.003 |
| Catalyst (Borchi ® Kat VP 0244) | 0.003 | |
| Xylene | 0.030 | 0.030 |

Polyurethanes 1 and 2: Two-Step Process According to the Invention

The polyurethanes 1 and 2 according to the invention were prepared by mixing the ingredients from the first step (step a) at a temperature of less than or equal to 95° C. under anhydrous conditions, followed by the addition of the ingredients indicated in the second step (step b), also at a temperature of less than or equal to 95° C., as indicated in table 2. The amounts indicated in table 2 are expressed as percentage by weight relative to the total weight of the polyurethane composition of each of the examples.

TABLE 2

| polyurethanes 1 and 2 according to the invention | | |
|---|---|---|
| | 1 | 2 |
| PPG triol having a number-average molar mass of 4000 g/mol - step a | 13.700 | 13.700 |
| PPG diol having a number-average molar mass of 2000 g/mol - step a | 68.467 | 68.467 |
| 4,4'-MDI (% NCO = 33.6% by weight) - step a | 5.500 | 5.500 |
| Catalyst (DOTL) - step a | | 0.003 |
| Catalyst (Borchi ® Kat VP 0244) - step a | 0.003 | |
| Xylene - step a | 0.030 | 0.030 |
| 4,4'-MDI (% NCO = 33.6% by weight) - step b | 12.300 | 12.300 |

Borchi® Kat VP 0244 is a catalyst based on zinc and bismuth carboxylates, available from Borchers.
Determining the Mechanical Properties of the Polyurethanes A, B, 1 and 2 Prepared According to the Processes Described Above.
The viscosity is measured at ambient temperature (23° C.) using a Brookfield viscometer according to standard ISO 2555.

The elongation at break was measured according to standard NF ISO 37 (March 2012).
The 100% modulus was measured according to standard ISO 11600 (with reference especially to standard ISO 8339).
The modulus of rupture was measured according to standard ISO 11600 (with reference especially to standard ISO 8339).
The results are indicated in table 3 below.

TABLE 3

| characterization of the polyurethanes | | | | |
|---|---|---|---|---|
| | Polyurethane A | Polyurethane 1 | Polyurethane B | Polyurethane 2 |
| Elongation at break (%) | 931 | 1754 | 780 | 1000 |
| 100% modulus (MPa) | 1020 | 300 | 1200 | 1070 |
| Modulus of rupture (MPa) | 4580 | 2300 | 4300 | 4400 |
| Viscosity (cP) | 74000 | 130000 | 105000 | 300000 |

The polyurethane A and the polyurethane 1 were prepared from the same ingredients but with two different processes; the polyurethane A was prepared by a one-step process in which all the diisocyanates (MDI) were introduced in one go, whereas the polyurethane 1 was prepared by a two-step process in which the diisocyanates (MDI) were introduced in two goes (bi-sequential process). Table 3 shows that the polyurethane 1 is different from the polyurethane A; indeed, the polyurethane 1 has a greater elongation at break (1754%) than the elongation at break of the polyurethane A (931%).

Similarly, the polyurethane B and the polyurethane 2 were prepared from the same ingredients but with two different processes; the polyurethane B was prepared by a one-step process in which all the diisocyanates (MDI) were introduced in one go, whereas the polyurethane 2 was prepared by a two-step process in which the diisocyanates (MDI) were introduced in two goes (sequential process). Table 3 shows that the polyurethane 2 is different from the polyurethane B; indeed, the polyurethane 2 has a greater elongation at break (1000%) than the elongation at break of the polyurethane B (780%).

Table 3 also makes it possible to demonstrate that the polyurethanes according to the invention exhibit an improvement in elastic recovery.

Preparation of Polyurethanes 3 to 6 According to the Invention

Other polyurethanes according to the invention were prepared. The polyurethanes 3 to 6 were prepared from different compositions of diisocyanate(s) during step a) of the process according to the invention. The polyurethanes 3 to 6 according to the invention were prepared by mixing the ingredients from the first step (step a) at a temperature of less than or equal to 95° C. under anhydrous conditions, followed by the addition of the ingredients indicated in the second step (step b), also at a temperature of less than or equal to 95° C., as indicated in table 4. The amounts indicated in table 4 are expressed as percentage by weight relative to the total weight of the polyurethane composition of each of the examples.

The isophorone diisocyanate (IPDI) used has a percentage of NCO functions of the order of 37.6% by weight. This is Vestanat® IPDI, available from Evonik Industries.

The toluene diisocyanate (TDI) used is Scuranate® T100, available from Vencorex Chemicals; it has a proportion of 2,4-TDI of at least 99% by weight of the TDI composition and a percentage of NCO functions of the order of 48.1% by weight.

Tolonate® X FLO 100 is available from Vencorex Chemicals; it has a proportion of NCO functions of the order of 12.3% by weight.

The m-xylylene diisocyanate (m-XDI) used is Takenate® 500, available from Mitsui Chemicals; it has a proportion of NCO functions of the order of 44.7% by weight.

The 4,4'-MDI used has a proportion of NCO functions of the order of 33.6% by weight.

Preparation of the Comparative Polyurethane C

The comparative polyurethane C was prepared by a similar process to the process used to produce polyurethanes 3 to 6, with the exception of the fact that the polyisocyanate composition introduced in step a) consists of a mixture of 50% by weight of 4,4'-methylenebis(phenyl isocyanate) and of 50% by weight of 2,4'-methylenebis(phenyl isocyanate) (a mixture which is also referred to as MIPI). The comparative polyurethane C was prepared from the ingredients indicated in table 4 below.

The MIPI used is Lupranat® MIPI available from BASF; it has a proportion of NCO functions of the order of 33.5% by weight.

TABLE 4 polyurethanes 3 to 6 according to the invention and comparative polyurethane C

|  | 3 | 4 | 5 | 6 | C |
|---|---|---|---|---|---|
| PPG triol having a number-average molar mass of 4000 g/mol - step a | 13.700 | 13.900 | 13.400 | 13.800 | 13.700 |
| PPG diol having a number-average molar mass of 2000 g/mol - step a | 68.467 | 69.667 | 66.967 | 69.067 | 68.467 |
| IPDI - step a | 4.700 | | | | |
| TDI - step a | | 3.900 | | | |
| Tolonate ® X FLO 100 - step a | | | 7.500 | | |
| m-XDI - step a | | | | 3.900 | |
| MIPI - step a | | | | | 5.500 |
| Catalyst (Borchi ® Kat VP 0244) - step a | 0.003 | 0.003 | 0.003 | 0.003 | 0.003 |
| Xylene - step a | 0.030 | 0.030 | 0.030 | 0.030 | 0.030 |
| 4,4'-MDI - step b | 13.100 | 12.500 | 12.100 | 13.200 | 12.300 |

Preparation of Mastic Compositions

Mastic compositions A, B, C and 1 to 6 were formulated from polyurethanes A, B, C and 1 to 6 prepared previously.

The mastic compositions were obtained by mixing the following ingredients:
- 26.7% by weight of a polyurethane prepared previously,
- 12% by weight of plasticizer,
- 25% by weight of filler(s),
- 13.6% by weight of PVC,
- 5.9% by weight of xylene,
- 10.2% by weight of urea gel,
- 6.6% by weight of other additives.

The mastic compositions thus formulated were characterized as reported in tables 5 and 5a below.

The skinning time was measured according to standard ISO 291.

The crosslinking after 24 h ("Cure 24 h") was measured according to standard ISO 291.

The Max modulus was measured according to standard ISO 11600.

The elongation at break was measured according to standard NF ISO 37 (March 2012).

The 100% modulus was measured according to standard ISO 11600.

TABLE 5 characterization of the mastic compositions A, B, 1 and 2

|  | Mastic A | Mastic 1 | Mastic B | Mastic 2 |
|---|---|---|---|---|
| Elongation at break (%) | 858 | 1300 | 449 | 1471 |
| 100% modulus (MPa) | 0.54 | 0.57 | 1 | 0.99 |
| Max modulus (MPa) | 1.05 | 1.26 | 2.63 | 2.04 |
| Crosslinking 24 h | 3 | 3 | 4 | 3.5 |
| Skinning time (min) | 67 | 75 | 50 | 45 |

TABLE 5a characterization of the mastic compositions C and 3 to 6

|  | Mastic C | Mastic 3 | Mastic 4 | Mastic 5 | Mastic 6 |
|---|---|---|---|---|---|
| Elongation at break (%) | 469 | 1274 | 1540 | 1550 | 1512 |
| 100% modulus (MPa) | 0.92 | 0.89 | 0.78 | 0.67 | 0.78 |
| Max modulus (MPa) | 2.09 | 1.99 | 1.57 | 1.13 | 1.78 |
| Crosslinking 24 h | 5 | 3.5 | 3 | 3 | 3 |
| Skinning time (min) | 35 | 75 | 110 | 120 | 98 |

Tables 5 and 5a show that the mastic compositions according to the invention (mastic composition 1 to 6) exhibit better elastic properties, in particular an elongation at break of greater than 1200%. Conversely, the comparative mastic compositions A, B and C exhibit an elongation at break of less than 900%.

The invention claimed is:

1. A process for preparing NCO-terminated polyurethanes, said polyurethane being non-solid at a temperature ranging from 5 to 35° C., said process comprising, successively:
   a) the reaction of a composition of diisocyanate(s) with a composition of polyol(s) with an NCO/OH molar ratio less than or equal to 0.8, in order to obtain an OH-terminated precursor polyurethane not comprising terminal NCO groups, at least one of said diisocyanates being present at an amount of at least 80% by weight relative to the total weight of the composition of diisocyanate(s), and
   b) the reaction of said OH-terminated precursor polyurethane obtained in this way with a diphenylmethylene diisocyanate composition in order to obtain NCO-terminated polyurethanes, said diphenylmethylene diisocyanate composition comprising at least 80% by weight of the same diphenylmethylene diisocyanate compound,
   steps a) and b) being carried out under anhydrous conditions.

2. The process as claimed in claim 1, wherein the composition of diisocyanate(s) used in a) comprises at least 85% by weight of the same diisocyanate, relative to the total weight of the composition of diisocyanate(s) used in a).

3. The process as claimed in claim 1, wherein the composition of diisocyanate(s) used during a) comprises at least one diisocyanate that is diphenylmethylene diisocyanate (MDI), isophorone diisocyanate (IPDI), toluene diisocyanate (TDI), xylylene diisocyanate (XDI), dibenzyl diisocyanate (DBDI), hexamethylene diisocyanate (HDI) or an allophanate derived from hexamethylene diisocyanate.

4. The process as claimed in claim 1, wherein the composition of diphenylmethylene diisocyanate used in b) comprises at least 85% by weight of the same diphenylmethylene diisocyanate compound, relative to the total weight of the composition of diphenylmethylene diisocyanate.

5. The process as claimed in claim 1, wherein the diphenylmethylene diisocyanate composition used in b) comprises at least 80% by weight of 4,4'-diphenylmethylene diisocyanate, relative to the total weight of the composition of diphenylmethylene diisocyanate.

6. The process as claimed in claim 1, wherein the polyol composition consists of a mixture of polyether diol and of polyether triol.

7. The process as claimed in claim 1, wherein the NCO/OH molar ratio during b) is strictly greater than 1.

8. The process as claimed in claim 1, wherein the NCO-terminated polyurethanes have an elongation at break of greater than or equal to 1000%.

9. An NCO-terminated polyurethane based on diphenylmethylene diisocyanate, capable of being obtained according to the process as defined in claim 1, said NCO-terminated polyurethane being non-solid at a temperature ranging from 5 to 35° C. and having an elongation at break of greater than or equal to 1000%.

10. A composition comprising:
   at least one NCO-terminated polyurethane based on diphenylmethylene diisocyanate, said NCO-terminated polyurethane being non-solid at a temperature ranging from 5 to 35° C. and having an elongation at break of greater than or equal to 1000%, produced by a process comprising, successively,
   a) the reaction of a composition of diisocyanate(s) with a composition of polyol(s) with an NCO/OH molar ratio less than or equal to 0.8, in order to obtain an OH-terminated precursor polyurethane not comprising terminal NCO groups, at least one of said diisocyanates being present at an amount of at least 80% by weight relative to the total weight of the composition of diisocyanate(s), and
   b) the reaction of said OH-terminated precursor polyurethane obtained in this way with a diphenylmethylene diisocyanate composition in order to obtain NCO-terminated polyurethanes, said diphenylmethylene diisocyanate composition comprising at least 80% by weight of the same diphenylmethylene diisocyanate compound,
   steps a) and b) being carried out under anhydrous conditions,
   at least one filler, and
   at least one crosslinking catalyst.

11. The composition as claimed in claim 10, comprising:
   from 10 to 40% by weight of NCO-terminated polyurethane,
   from 20 to 70% by weight of at least one filler,
   from 0.01 to 1% by weight of at least one crosslinking catalyst,
   the percentages by weight being expressed relative to the total weight of the composition.

12. An article comprising the composition as claimed in claim 10, in an airtight hermetic packaging.

13. An NCO-terminated polyurethane based on diphenylmethylene diisocyanate, obtained according to the process as defined in claim 1, said polyurethane being non-solid at a temperature ranging from 5 to 35° C. and having an elongation at break of greater than or equal to 1000%.

14. The process as claimed in claim 1, wherein the composition of diisocyanate(s) used in a) comprises at least 95% by weight of the same diisocyanate, relative to the total weight of the composition of diisocyanate(s) used in a).

15. The process as claimed in claim 1, wherein the composition of diphenylmethylene diisocyanate used in b) comprises at least 98% by weight of the same diphenylmethylene diisocyanate compound, relative to the total weight of the composition of diphenylmethylene diisocyanate.

16. The process as claimed in claim 1, wherein the NCO/OH molar ratio during b) is strictly greater than or equal to 1.7.

17. The composition as claimed in claim 10, comprising:
   from 15 to 30% by weight, of NCO-terminated polyurethane,
   from 25 to 60% by weight, of at least one filler,
   from 0.01 to 1% by weight of at least one crosslinking catalyst,
   the percentages by weight being expressed relative to the total weight of the composition.

18. An NCO-terminated polyurethane based on diphenylmethylene diisocyanate, obtained according to the process as defined in claim 1, said NCO-terminated polyurethane being non-solid at a temperature ranging from 5 to 35° C. and having an elongation at break of greater than or equal to 1000%.

* * * * *